US005724453A

United States Patent [19]
Ratnakar et al.

[11] Patent Number: 5,724,453
[45] Date of Patent: Mar. 3, 1998

[54] IMAGE COMPRESSION SYSTEM AND METHOD HAVING OPTIMIZED QUANTIZATION TABLES

[75] Inventors: Viresh Ratnakar; Miron Livny, both of Madison, Wis.

[73] Assignee: Wisconsin Alumni Research Foundation, Madison, Wis.

[21] Appl. No.: 500,000

[22] Filed: Jul. 10, 1995

[51] Int. Cl.$^6$ .............................. G06K 9/36; G06K 9/38; G06K 9/46

[52] U.S. Cl. .................... 382/251; 382/239; 382/250; 340/825.8; 348/405; 358/432; 358/433; 364/514 C; 379/67; 395/600

[58] Field of Search ..................... 382/239, 250, 382/251; 348/405; 358/432, 433; 340/825.8; 364/514 C; 379/67; 395/600

[56] References Cited

U.S. PATENT DOCUMENTS

| | | | |
|---|---|---|---|
| 4,821,034 | 4/1989 | Anderson et al. | 340/825.8 |
| 5,278,646 | 1/1994 | Civanlar et al. | 348/384 |
| 5,426,512 | 6/1995 | Watson | 358/432 |
| 5,455,943 | 10/1995 | Chambers, IV | 395/600 |
| 5,541,852 | 7/1996 | Eyuboglu et al. | 364/514 C |
| 5,586,171 | 12/1996 | McAllister et al. | 379/67 |

OTHER PUBLICATIONS

Gregory K. Wallace, "The JPEG Still Picture Compression Standard", Communications of the ACM, vol. 34, No. 4, pp. 30–44, Apr. 1991.

William B. Pennebaker & Joan L. Mitchell, "JPEG Still Image Data Compression Standard", pp. 40–41, 127–134, 354–359, 539–540 (1993).

D.M. Monro & B.G. Sherlock, "Optimum DCT Quantization",Proc. Data Compression Conf., pp. 188–194, 1993.

Viresh Ratnakar, et al., "Runlength encoding of quantized DCT coefficients", IBM RC 19693 (87318), Aug. 5, 1994.

V. Ratnakar, & M. Livney, "Performance of Customized DCT Quantization Tables on Scientific Data", Sci. Info. Mgmt. & Data Compression Workshop Proc., NASA Conf. Publ. 3277, pp. 1–8, Sep. 1994.

Andrew B. Watson, "Visually optimal DCT quantization matrices for individual images".

Primary Examiner—Leo Boudreau
Assistant Examiner—Daniel G. Mariam
Attorney, Agent, or Firm—Foley & Lardner

[57] ABSTRACT

A digital image compression preprocessor for use in a discrete cosine transform-based digital image compression device is provided. The preprocessor includes a gathering mechanism for determining discrete cosine transform statistics from input digital image data. A computing mechanism is operatively coupled to the gathering mechanism to calculate a image distortion array and a rate of image compression array based upon the discrete cosine transform statistics for each possible quantization value. A dynamic programming mechanism is operatively coupled to the computing mechanism to optimize the rate of image compression array against the image distortion array such that a rate-distortion-optimal quantization table is derived. In addition, a discrete cosine transform-based digital image compression device and a discrete cosine transform-based digital image compression and decompression system are provided. Also, a method for generating a rate-distortion-optimal quantization table, using discrete cosine transform-based digital image compression, and operating a discrete cosine transform-based digital image compression and decompression system are provided.

44 Claims, 5 Drawing Sheets

IMAGE COMPRESSION SYSTEM AND METHOD HAVING OPTIMIZED QUANTIZATION TABLES

This invention was made with United States Government support awarded by the NASA, Grant No. NAGW-3914 and NSF, Grant No. IRI-9224741. The United States Government has certain rights in this invention.

This invention was made with United States Government support awarded by the National Science Foundation (NSF), Grant No. IRI-9224741 and the National Aeronautical Space Administration (NASA), Grant No. NAGW-3914. The United States Government has certain rights in this invention.

FIELD OF THE INVENTION

The present invention relates to digital image compression and more particularly to compression techniques which utilize discrete cosine transforms.

BACKGROUND OF THE INVENTION

The Discrete Cosine Transform (DCT) lies at the heart of many commonly used lossy image and video compression schemes such as the Joint Photographic Experts Group (JPEG), Motion Picture Experts Group (MPEG), and H.261 compression standards. It will be appreciated by those skilled in the art that MPEG currently consists of several different algorithms including: the original MPEG algorithm which was designed for video (motion) images, the MPEG-2 Video algorithm which was designed to specify a coded bit-stream for high-quality digital video, the MPEG-2 Audio algorithm which was designed for multi-channel audio coding, and the MPEG-2 Systems algorithm which specifies how to combine multiple audio, video, and private-data streams into a single multiplexed stream.

The extent of compression achieved in any of these compression algorithms depends upon the coarseness of quantization of the transform coefficients. The coarser the quantization, the lesser the entropy of the quantized coefficients. But, coarse quantization also leads to poor quality of the decompressed image. Thus, the particular quantization table used directly determines the rate-distortion tradeoff (i.e., the compression-quality tradeoff).

Several approaches have been tried in order to design quantization tables for particular distortion or rate specifications. The most common of these is to use a default table and scale it up or down by a scalar multiplier to vary quality and compression. Other approaches include psycho-visual model based quantization, rate-distortion model based quantization, and stochastic optimization techniques.

A need still exists for a compression algorithm for optimum quantization table design that does not rely on visual or rate-distortion models and is not very expensive in terms of computation time. The algorithm should admit a wide range of quality measures such as Peak Signal to Noise Ratio (PSNR) and weighted PSNR. Also, the algorithm should produce quantization tables that optimize the tradeoff between quality and compressed size. In addition, the algorithm should simultaneously optimize quantization tables over a wide range, rates as well as distortions.

The present invention provides a solution to this and other problems, and offers other advantages over the prior art.

SUMMARY OF THE INVENTION

A digital image compression preprocessor for use in a discrete cosine transform-based digital image compression device is provided. The preprocessor includes a gathering mechanism for determining discrete cosine transform statistics from input digital image data. A computing mechanism is operatively coupled to the gathering mechanism to calculate an image distortion array and a rate of image compression array based upon the discrete cosine transform statistics for each possible quantization value. A dynamic programming mechanism is operatively coupled to the computing mechanism to optimize the rate of image compression array against the image distortion array such that a rate-distortion-optimal quantization table is derived. In addition, a discrete cosine transform-based digital image compression device and a discrete cosine transform-based digital image compression and decompression system are provided. Also, a method for generating a rate-distortion-optimal quantization table, using discrete cosine transform-based digital image compression, and operating a discrete cosine transform-based digital image compression and decompression system are provided.

These and various other features as well as advantages which characterize the present invention will be apparent upon reading of the following detailed description and review of the associated drawings.

DETAILED DESCRIPTION OF THE PREFERRED EMBODIMENT

Figure 1:
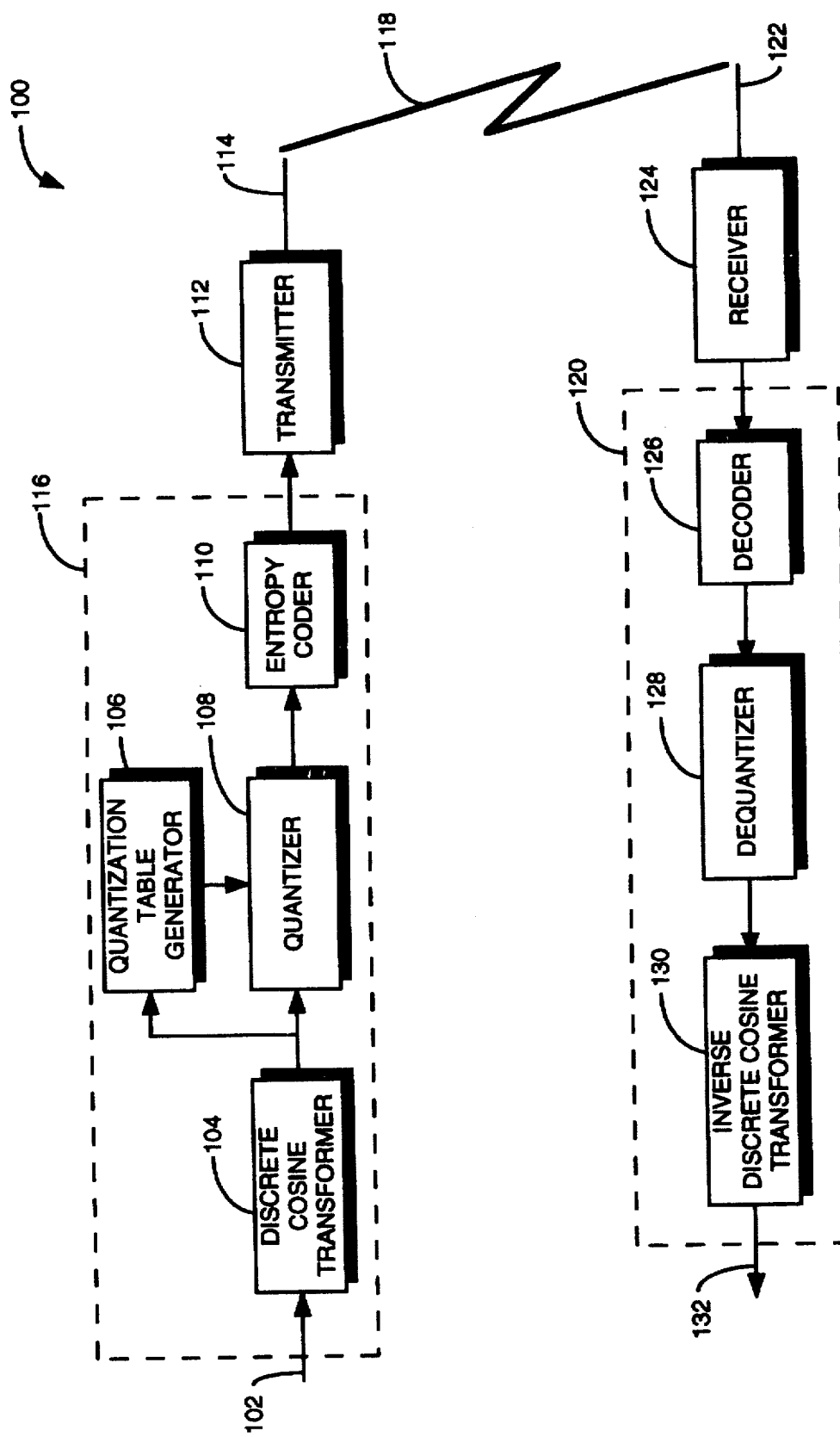
FIG. 1 is a block diagram showing a preferred embodiment discrete cosine transform-based digital image compression and decompression system in accordance with the present invention.

The human visual system is not very sensitive to sudden changes in intensity across an image. Lossy image compression techniques strive to discard that part of the image structure which is less perceptible to the eye. The two-dimensional Discrete Cosine Transform (DCT) offers an efficient way to break up the underlying structure of an image into different spatial-frequency components. The high-frequency components are less perceptible to the eye compared to the low-frequency components. Thus, the DCT orders the information-content of an image into parts with different degrees of visual importance. These parts can then be selectively discarded or stored, with varying degrees of accuracy, for lossy compression of the image. The compression-ratio increases as more and more information is thrown away. DCT-based compression techniques typically allow the user to specify a table (called the quantization table) that stipulates the level of accuracy with which each spatial-frequency component is to be stored.

The basic steps used in DCT-based image compression and decompression will be described below.

Let I be a W×H image with pixel values in the range [0 ... M]. The DCT-based compression process consists of the following steps.

1. The image is divided into 8×8 blocks. To each image block f, the DCT is applied to get an 8×8 block $\hat{f}$ of DCT coefficients. Each coefficient represents the amount of a particular spatial-frequency content of f. The lowest frequency coefficient (also called the DC coefficient) is $\hat{f}(0,0)$ while the highest frequency coefficient is $\hat{f}(7,7)$.

2. An 8×8 matrix of integers Q, called the quantization table, is used to quantized the coefficients in $\hat{f}$ to form $\hat{f}_Q$. For notational convenience, we number the 64 entries in each 8×8 image block and each 8×8 block of DCT coefficients in raster-scan order, and use this ordering to refer to individual entries in the various blocks. Thus, f(u,v) is referred to as f[8u+v]. Using this notation.

$$\hat{f}_Q[n] = \hat{f}[n] // Q[n], \quad 0 \leq n \leq 63$$

where, // represents division followed by rounding to the nearest integer. For example, for any $$b > 0, a // b = \begin{cases} \lfloor \frac{a}{b} + 0.5 \rfloor, & \text{if } a \geq 0 \\ -\lfloor \frac{-a}{b} + 0.5 \rfloor, & \text{if } a < 0 \end{cases}$$

It will be appreciated that $\lfloor x \rfloor$ calculates the largest integer$\leq x$.

3. The block $\hat{f}_Q$ is entropy-coded (e.g., with Huffman codes) to exploit similarities across blocks to give the compressed block $E(\hat{f}_Q)$. The sequence of these compressed blocks forms the compressed image.

The decompression process reverses these steps as follows:

1. Each entropy-coded block $E(\hat{f}_Q)$ is decoded to get the corresponding block of quantized coefficients $\hat{f}_Q$.

2. Dequantization is done to construct the block $\hat{f}'$, as follows:

$$\hat{f}'[n] = \hat{f}_Q[n] \cdot Q[n], \quad 0 \leq n \leq 63$$

3. The two-dimensional Inverse Discrete Cosine Transform (IDCT), is applied $\hat{f}'$ to get the decompressed image block f'. These decompressed blocks form the decompressed image I'.

The lossiness of the compression is essentially because of the quantization step ($\hat{f} \rightarrow \hat{f}_Q$), as in general, $$\hat{f}'[n] = \hat{f}_Q[n] \cdot Q[n] = \hat{f}[n] // Q[n]) \cdot Q[n] \neq \hat{f}[n]$$

This causes differences in pixel values between the original image block f and its approximation, the decompressed image block f'. The mean-squared-error between f and f' is known as distortion in f caused by Q and is denoted as D(f,Q).

$$D(f,Q) = \frac{1}{64} \sum_{n=0}^{63} (f[n] - f'[n])^2$$

The distortion D(I,Q) between an image I and its approximation I' due to quantization by Q is similarly defined as the mean-squared-error between corresponding pixel values. Clearly, D(I,Q) is the mean value of all D(f,Q) over all constituent blocks f in I. The distortion D(I,Q) is used to judge the "quality" of I', in quality measures such as Signal-to-Noise Ratio (SNR) and Peak Signal-to-Noise Ratio (PSNR):

$$PSNR = 10 \log 10 \frac{M^2}{D(I,Q)}$$

$$SNR = 10 \log 10 \frac{S}{D(I,Q)}$$

Here S is the mean-squared pixel value over I. Higher distortion implies poorer quality and vice versa. As entries in Q are made higher, D(I,Q) tends to increase.

The distortion between the DCT coefficient-block $\hat{f}$ and its approximation $\hat{f}'$ resulting from quantization by Q, is $$D(\hat{f},Q) = \frac{1}{64} \sum_{n=0}^{63} (\hat{f}[n] - \hat{f}'[n])^2$$

In designing rate-distortion-optimal quantization tables, the following property of the DCT can be exploited:

$$D(f,Q) = D(\hat{f},Q)$$

That is, the mean squared error in the pixel-domain is the same as the mean squared error in DCT-domain. This can be seen as follows:

$$DCT(f) = \hat{f}$$
$$IDCT(\hat{f}') = f'$$
$$\Rightarrow DCT(f') = \hat{f}'$$
$$\Rightarrow DCT(f - f') = \hat{f} - \hat{f}' \quad \text{using linearity of DCT}$$
$$\Rightarrow \sum_{n=0}^{63} (f[n] - f'[n])^2 = \sum_{n=0}^{63} (\hat{f}[n] - \hat{f}'[n])^2 \quad \text{since DCT preserves } L^2 \text{ norms}$$
$$\Rightarrow D(f,Q) = D(\hat{f},Q)$$

This implies that D(I,Q) can be split as a sum into distortions in various DCT coefficients. Let $D_n(I, q)$ be defined as:

$$D_n(I,q) = \frac{1}{64} \text{Mean}\{(\hat{f}[n] - \hat{f}'[n])^2\}$$

Where $\hat{f}'[n] = (\hat{f}[n]//q) \cdot q$ and the mean is taken over all the blocks in the image. Then $$D(I,Q) = \sum_{n=0}^{63} D_n(I,Q[n])$$

Since the focus of this discussion is on the effects of different quantization tables on a given image, the distortion D(I,Q) can be denoted simply as D(Q). Similarly, the distortion $D_n(I,q)$ in the $n^{th}$ coefficient can be denoted by $D_n(q)$. Then, $$D(Q) = \sum_{n=0}^{63} D_n(Q[n])$$

This decomposition of D(Q) into contributions from individual coefficients is important as it simplifies the task of minimizing D(Q) to that of minimizing a sum, each of whose components depends on just one entry in Q. The rate (or compressed size) resulting from Q can also be split similarly into a sum. These two properties of the DCT allow the problem of optimizing the rate-distortion tradeoff to be solved using a dynamic programming approach for minimizing two sums.

The degree of compression achieved is usually expressed in terms of the rate of the compressed image, which is the number of bits used per pixel:

$$\text{rate} = \frac{\text{size of compressed image in bits}}{\text{number of pixels in the image}}$$

Low rates are achieved when the quantized blocks $\hat{f}_Q$ have similar entries (low entropy). The most common case is that of a coefficient being quantized to zero. The more zeros there are in $\hat{f}_Q$ the fewer bits it would take to store it. Thus, increasing the entries of Q tends to decrease the rate. We denote the rate resulting with the use of a particular quantization table, Q, as R(Q).

DCT has the nice property of being very close to the Karhunen-Loeve-Hotelling transform, a transform that produces uncorrelated coefficients. The lack of correlation between coefficients allows the rate to be decomposed as a sum of contributions from individual coefficients. It will be appreciated by those skilled in the art that the coefficient-wise average of entropies of the quantized DCT coefficients is a very good estimate of the rate resulting from two-pass Huffman coding of run lengths. This means that R(Q) can be approximated as a sum of rates of individuals coefficients. Let $R_n(q)$ be defined as $$R_n(q) = \frac{1}{64} \text{Entropy}\{(\hat{f}[n])/\!/q\}$$

Where the entropy is measured over all the blocks in the image. If $(\hat{f}[n]/\!/q)$ takes the value v in a fraction $p_v > 0$ of all blocks $\hat{f}$, then this entropy is $-\Sigma_v p_v \log_2 p_v$. Then, $$R(Q) = \sum_{n=0}^{63} R_n(Q[n]).$$

Thus, R(Q) can also be decomposed into a sum of contributions from individual coefficients, just like D(Q).

It is desirable to have a low rate (high compression) and a low distortion (high quality). However, varying Q has opposite effects on D(Q) and R(Q). The distortion D(Q) tends to increase and the rate R(Q) tends to decrease as the entries in Q are made larger. The tradeoff between D(Q) and R(Q) is different for different images. The following discussion is directed to RD-OPT, an algorithm for constructing quantization tables with optimal rate-distortion tradeoffs for a given image.

The problem of choosing Q to optimize the rate-distortion tradeoff for a given image, I, can be stated in two ways:

1. Given a target distortion $\Delta$, find Q such that $D(Q) \leq \Delta$ and the rate R(Q) is minimized.
2. Given a target rate B bits per pixel (bpp), find Q such that $R(Q) \leq B$ and the distortion D(Q) is minimized.

We call the quantization tables Q that satisfy these conditions (for some $\Delta$ or B) RD-optimal.

RD-OPT takes an image I as input and produces RD-optimal quantization tables for a wide range of rates and distortions. The contributions to rate and distortion of individual coefficients, $R_n(Q[n])$ and $D_n(Q[n])$, respectively, just depend on the entry Q[n] of Q. RD-OPT first calculates ($R_n(Q[n])$ and $D_n(Q[n])$) for each possible value of Q[n], and then uses a dynamic programming approach to minimize sums of $R_n(Q[n])$ against sums of $D_n(Q[n])$. To calculate $R_n(q)$ and $D_n(q)$ for each possible q, a preliminary pass through the image is run to gather DCT statistics which are used in a novel way.

Figure 2:
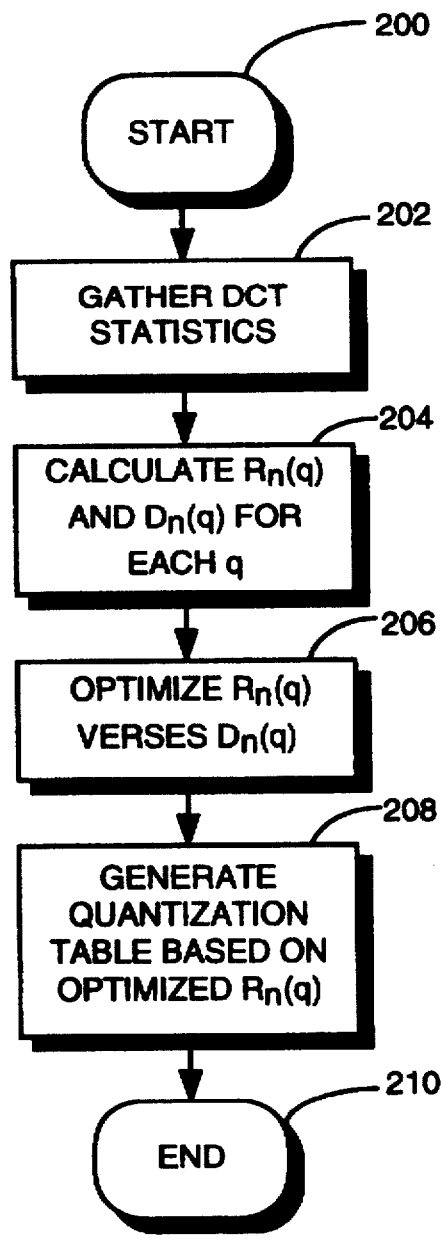
FIG. 2 is a flowchart of the preferred embodiment RD-OPT algorithm used in the system shown in FIG. 1 in accordance with the present invention.

RD-OPT, as shown in FIG. 2 steps 200 through 210, has several main steps. An image I of width W and height H, with pixel values in the range [0 . . . M] is input. DCT statistics for the image are gathered 202. The statistics are used 204 to calculate $R_n(q)$ and $D_n(q)$ for each possible q. Dynamic programing is used to optimize 206 R(Q) against D(Q) and generate 208 RD-optimal DCT quantization tables Q based on an optimized $R_n(q)$.

Figure 3:
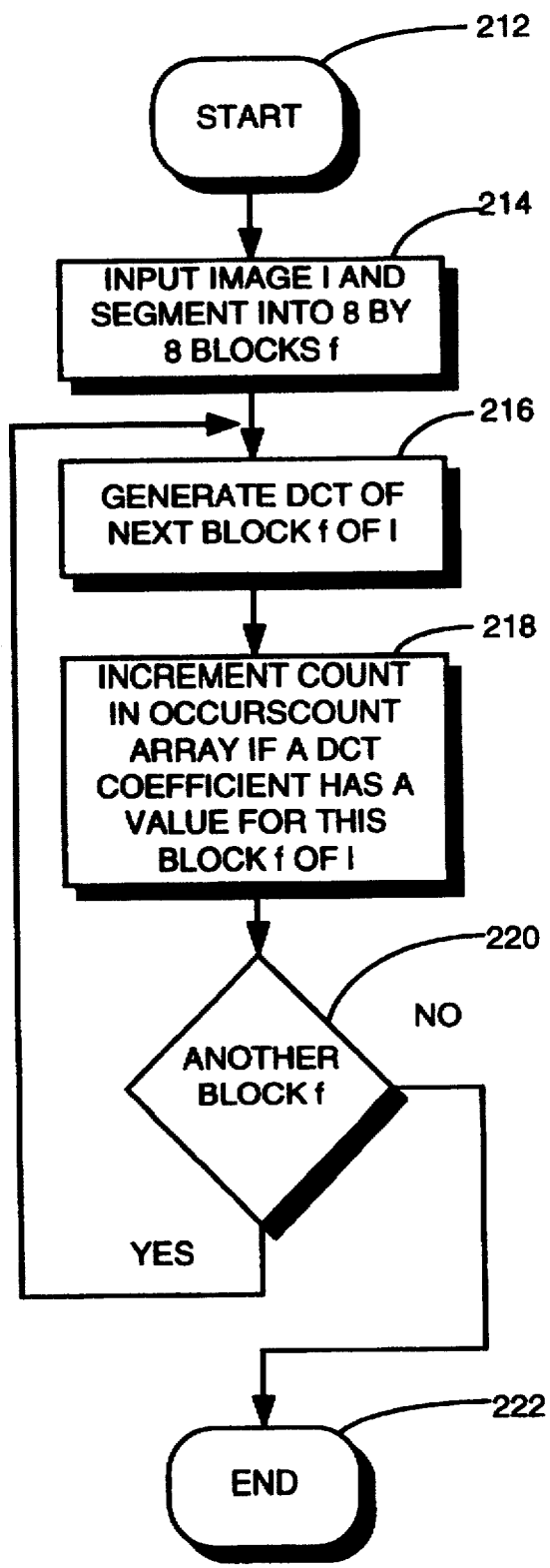
FIG. 3 is a more detailed flowchart of the preferred embodiment DCT statistics gathering step in accordance with the present invention for the RD-OPT algorithm shown in FIG. 2.

The tasks for the gathering DCT statistics step are further detailed in flowchart elements 212 through 222 shown in FIG. 3. These DCT statistics for the image should answer the questions:

1. How many times does the $n^{th}$ coefficient get quantized to value v when Q[n]=q?
2. What is the mean-squared error for the $n^{th}$ coefficient when Q[n]=q?

For any real number c, let $$\text{Bucket}(c) = \begin{cases} \lfloor 2c \rfloor & \text{if } c \geq 0 \\ -\lfloor -2c \rfloor & \text{if } c < 0 \end{cases}$$

It can be shown that for any integer $q \geq 1$, $$c/\!/q = \text{Bucket}(c)/\!/2q.$$

Hence, it suffices to gather statistics by counting the number of times each DCT coefficient takes a value in a particular bucket, as this count can then be used to calculate the number of times a particular quantized coefficient takes a particular value. The unquantized coefficient value itself can be approximated to within ±0.25. It will be appreciated by those skilled in the art that bucket (0) which corresponds to values in the interval (−0.5,0.5) must be split into two buckets, but this detail is ignored for the following discussion for added clarity and simplicity. This simplification introduces some error to the calculations, but the simplified calculations are still monotonically related to the more accurate calculations and as such will produce nearly the same result.

Procedure GatherStats, as shown in Table 1 as a series of pseudo-software code, fills an array OccursCount|0 . . . 63||−2VMAX . . . 2VMAX|. The constant VMAX is the maximum absolute value any DCT coefficient can take (i.e., for 1-byte samples, M=255 and VMAX=2048). The value OccursCount[n][v] at the end is the number of blocks where the $n_{th}$ DCT coefficient $c_n$ is such that Bucket($c_n$)=v.

GatherStats works by going through each 8×8 block f in I 214 and calculating its Discrete Cosine Transform g 216. For each coefficient g[n], the count OccursCount[n][Bucket (g[n])] is incremented by one 218.

TABLE 1

```
Procedure GathersStats
    Input: Image I
    Output: Array OccursCount[0 . . . 63] [-2VMAX . . . 2VMAX]
    1. Initialize OccursCount to 0 everywhere
    2. For each 8×8 block f in I
    3.     g := DCT(f)
    4.     For n := 0 to 63
    5.         v := Bucket(g[n])
    6.         OccursCount[n] [v] ++
```

Figure 4:
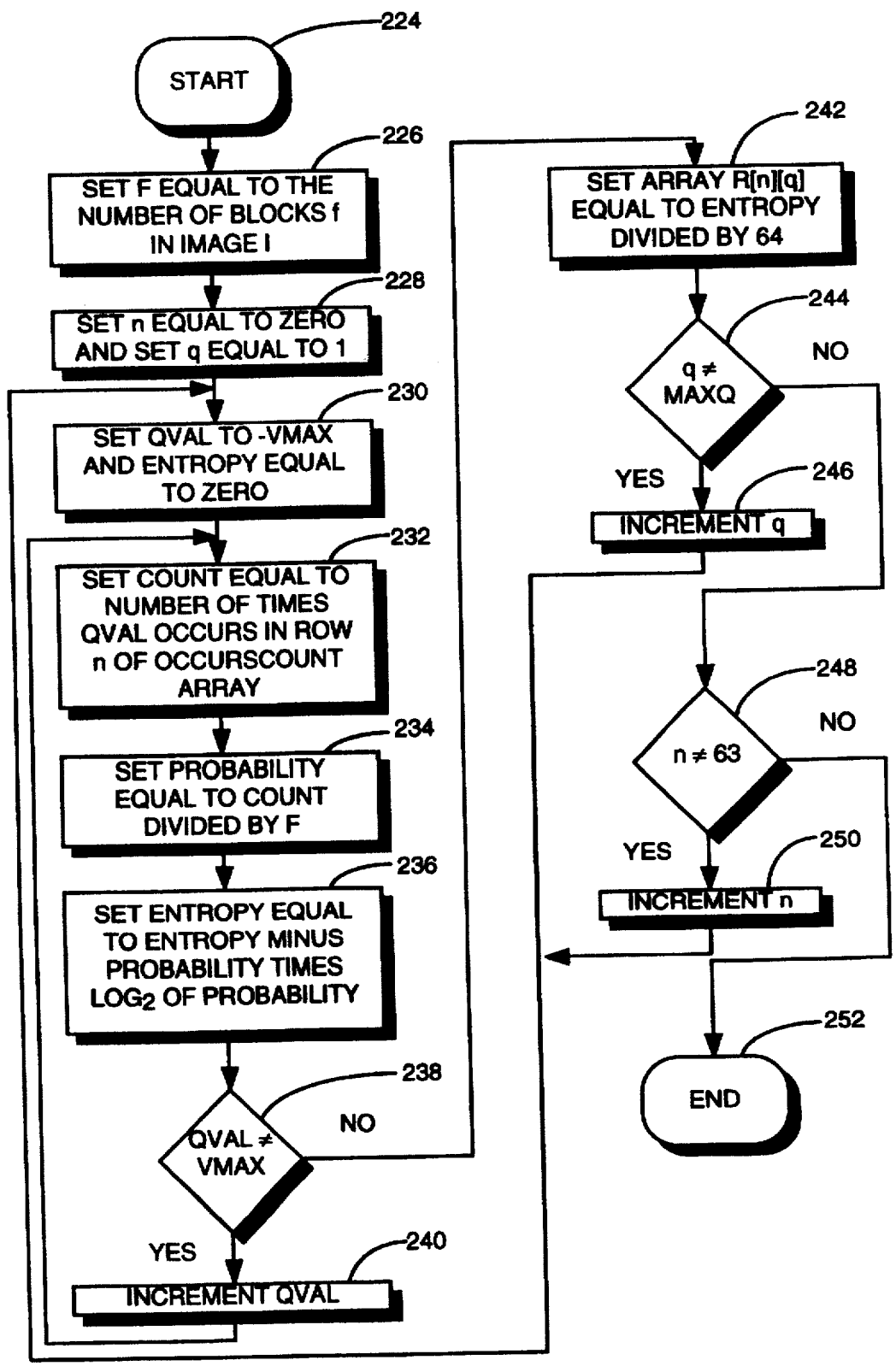
FIG. 4 is a more detailed flowchart of the preferred embodiment $R_n(q)$ calculating step in accordance with the present invention for the RD-OPT algorithm shown in FIG. 2.
Figure 5:
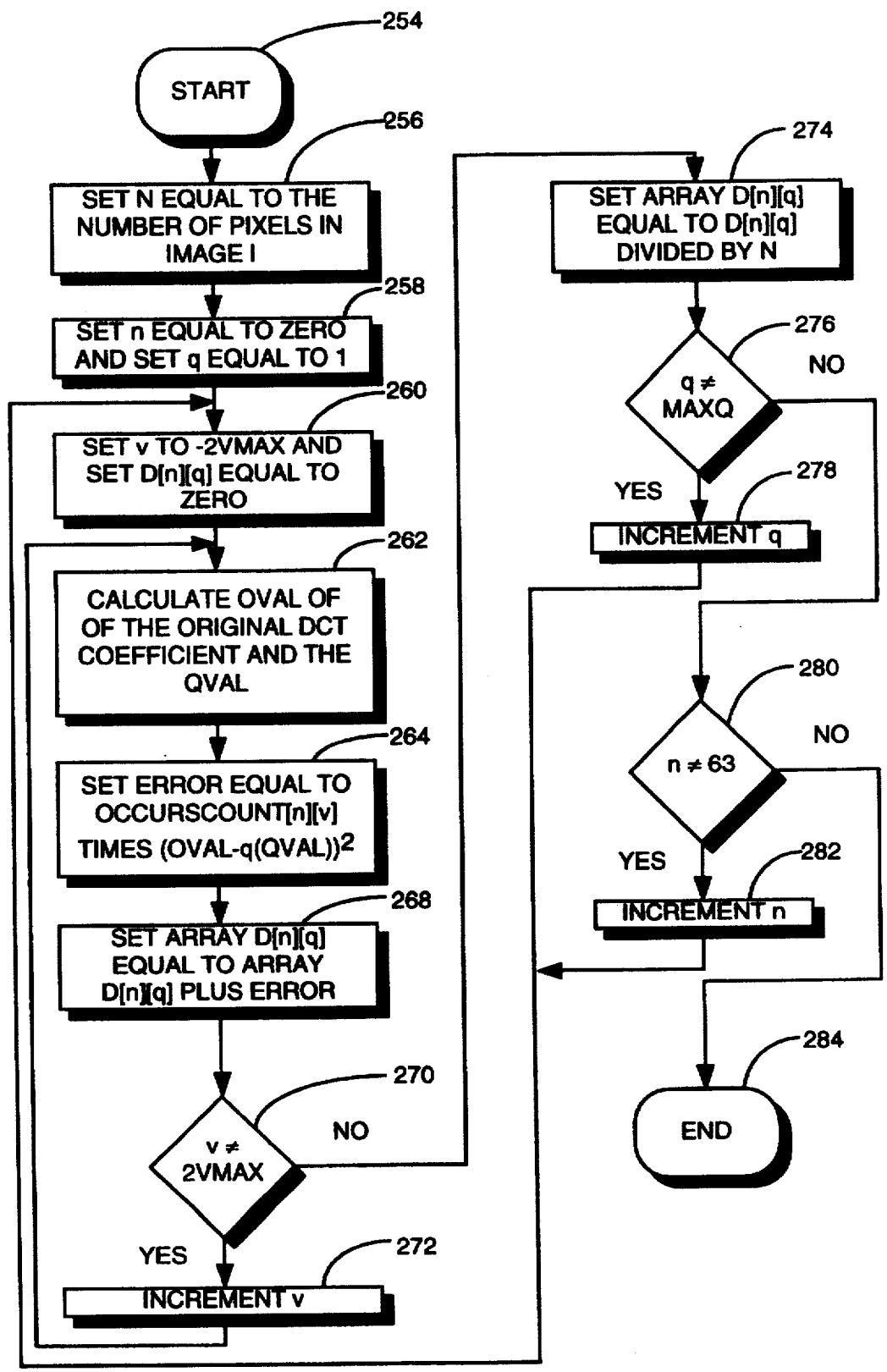
FIG. 5 is a more detailed flowchart of the preferred embodiment $D_n(q)$ calculating step in accordance with the present invention for the RD-OPT algorithm shown in FIG. 2.

The step of calculating $R_n(q)$ and $D_n(q)$ is further detailed in FIGS. 4 and 5 in steps 224 through 284. Let the possible range of values of any quantization table entry q be $1 \leq q \leq MAXQ$. Let R[0 . . . 63][1 . . . MAXQ] and D[0 . . . 63][1 . . . MAXQ] be two-dimensional arrays. The task of this step is to fill these arrays using the array OccursCount such that, $$R[n][q] = R_n(q)$$

$$D[n][q] = D_n(q)$$

This is accomplished by procedures FillR and FillD.

FillR, shown in FIG. 4 and detailed in pseudo-software code in Table 2, fills the array R by calculating the entropy 242 of the $n^{th}$ coefficient when quantized by q, for all n and q. For each possible quantized value (QuantizedVal), the variable Count is used to compute the number of times the $n^{th}$ coefficient gets quantized (by q) to QuantizedVal 232. Count is simply the sum of all OccursCount [n][v] such that v//(2q) is equal to QuantizedVal. If F is the total number of blocks in I, then, the entropy is calculated as:

TABLE 2

```
Procedure FillR
Input: Array OccursCount[0 . . . 63] [-2VMAX . . . 2VMAX]
Output: Array R[0 . . . 63] [1 . . . MAXQ]
    1. F := Number of 8×8 blocks in the image
    2. For n := 0 to 63
    3.     For q := 1 to MAXQ
    4.         Entropy = 0
    5.         For QuantizedVal := (-VMAX) // q to VMAX // q
               /* QuantizedVal is the quantized value */
    6.             Count := 0 /* Count is the # of times the
                   value QuantizedVal occurs */
    7.             For each v such that v // (2q) ==
                       QuantizedVal
    8.                 Count := Count + OccursCount[n] [v]
    9.             Probab := Count/F
    10.            If (Probab > 0) then
    11.                Entropy := Entropy - (Probab *
                           Log2 (Probab))
    12.        R[n] [q] := Entropy/64.0
```

FillD, shown in FIG. 5 and detailed in pseudo-software code in Table 3, fills the array D by calculating the error in quantizing the $n^{th}$ coefficient by q, for each n and q. For each integer v in the range -2VMAX . . . 2VMAX, the $n^{th}$ coefficient gets quantized to the value QuantizedVal (=v//(2q)) in OccursCount[n][v] blocks. The actual (unquantized) value of the coefficient in each of these blocks is estimated by the variable OrginalVal 262, to within ±0.25. Hence for each v, the error is incremented by OccursCount[n][v] times (OriginalVal-q times QuantizedVal)² 262.

TABLE 3

```
Procedure FillD
Input: Array OccursCount[0 . . . 63] [-2VMAX . . . 2VMAX]
Output: Array D[0 . . . 63] [1 . . . MAXQ]
    1. N := Number of pixels in the image
    2. For n := 0 to 63
    3. For q := q to MAXQ
    4.     D[n] [q] := 0
    5.     For v := -2VMAX to 2VMAX
           */ OriginalVal is the original coefficient
              value, within 0.25 */
    6.         OriginalVal = v/2.0 + ((v < 0) ? -0.25 : 0.25)
               /* QuantizedVal is the quantized value */
    7.         QuantizedVal = v // (2g)
    8.         Error := OccursCount [n] [v] * Square(OriginalVal
                   - q*QuantizedVal)
    9.         D[n] [q] := D[n] [q] + Error
    10. D[n] [q] := D[n] [q]/N
```

Figure 6:
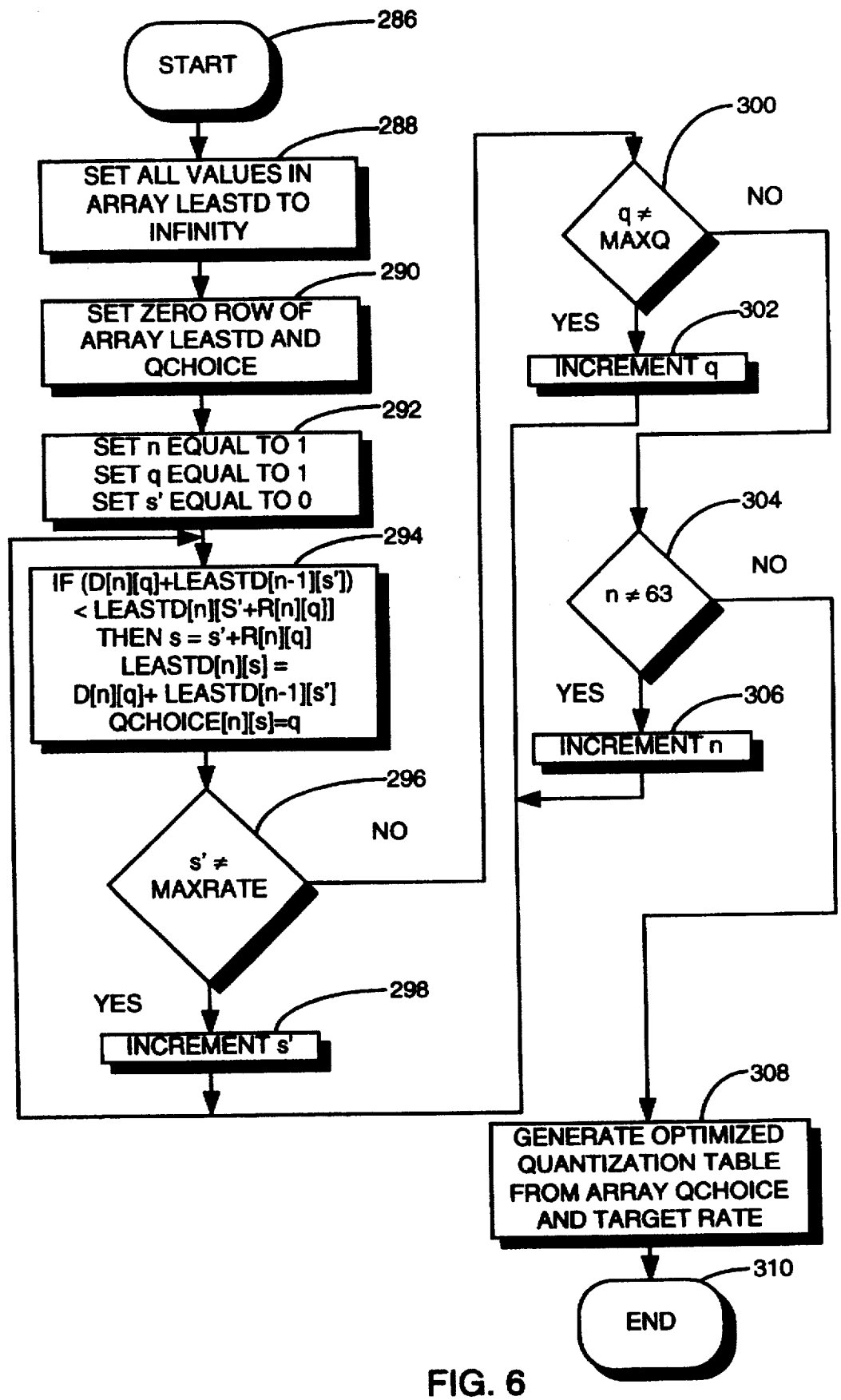
FIG. 6 is a more detailed flowchart of the preferred embodiment finding RD-optimal Q step in accordance with the present invention for the RD-OPT algorithm shown in FIG. 2.

The step of finding RD-optimal Q is further detailed in FIG. 6 in steps 286 through 310. The arrays R[. . . ][. . . ] and D[. . . ][. . . ] are used in this step to find rate-distortion-optimal quantization tables. A dynamic programing (DP) approach is used. For this approach either R(Q) or D(Q) must be discretized to integral values so that it can be used as an index in the DP table. It will be appreciated by those skilled in the art that this will cause errors in the quantity discretized.

Let BPPSCALE be a large integer constant. R(Q) is discretized to be integral by multiplying each R[n][q] with BPPSCALE and rounding off. This can be done in Procedure FillR itself, by inserting the following pseudo-software code lines after line 12 as detailed in Table 4. Alternatively, this can be done by the same pseudo software code lines by inserting them before line 1 in the Procedure FillLeastD.

TABLE 4

```
For n := 0 to 63
    For q := 1 to MAXQ
        R[n] [q] := (R[n] [q] *BPPSCALE) //1
```

For the rest of this section, only discretized values will be referred to when referring to R(Q), and $R_n(q)=R[n][q]$. Let MAXRATE be the discretized value of the highest rate for which we are interested in finding an RD-optimal quantization table. Let LeastD[0 . . . 63][0 . . . MAXRATE] be an array whose entries have the following definition: LeastD [n][s] is the least total distortion for coefficients numbered 0 through n such that the total rate (for these coefficients) is exactly s. That is, LeastD[n][s] is the least value (over all Q) of $$\sum_{k=0}^{n} D[k][Q[k]]$$

subject to the constraint $$\sum_{k=0}^{n} R[k][Q[k]] = s.$$

The procedure starts with each entry in LeastD set to $\infty$ 288 and then fills the rows one by one. The key idea is described in Theorem 1.

Theorem 1:

For each $n$, $1 \leq n \leq 63$, and each $s$, $0 \leq s \leq \text{MAXRATE}$, let $X(n, s)$ be the set $$X(n, s) = \left\{ D[n][q] + \text{LeastD}[n-1][s'] \;\middle|\; \begin{array}{l} 1 \leq q \leq \text{MAXQ} \\ s' = s - R[n][q] \\ s \geq 0 \end{array} \right\}$$

Then, $$\text{LeastD}[n][s] = \begin{cases} \min X(n, s) & \text{if } X(n, s) \text{ is non-empty} \\ \infty & \text{otherwise} \end{cases}$$

Proof: Suppose X (n,s) is empty or min X (n,s) is ∞. Then, for every $q(1<q<\text{MAXQ})$, either $R[n][q]>s$, or LeastD[n-1][s-R[n][q]]=∞. In either case, the rate s cannot be achieved from coefficients 0 through n, implying LeastD[n][s]=∞.

Now assume X(n,s) is non-empty and that d is the minimum value in X (n,s), achieved by setting Q[n] to q. Assume LeastD[n][s]=d'>d. Then the distortion d' must be achieved with some value say q' for Q[n]. Let d"=d'-D[n][q']. Then the distortion d" must be achieved from coefficients 0-through n-1, with their rate being exactly equal to s-R[n][q']. But then, d"=LeastD[n-1][s-R[n][q']], as otherwise d' can be improved, contradicting d'=LeastD[n][s]. Hence, d'=D[n][q']+LeastD[n-1][s-R[n][q'] implying d'εX (n,s). Thus d≤d', which contradicts d'>d.

To recover the RD-optimal quantization table for any desired distortion or rate, another data structure QChoice[0 . . . 63][0 . . . MAXRATE] is maintained. QChoice[n][s] stores the value q that gave the entry in LeastD[n][s].

The procedure FillLeastD, which fills the array LeastD, using Theorem 1 is shown below in Table 5 in pseudo-software code and corresponds to steps 288 to 306 in FIG. 6. Row number n is filled using row number n-1, D[n][. . . ], and R[n][. . . ]. For each q and each s', D[n][q]+LeastD[n-1][s'] is compared with LeastD[n][s'+R[n][q]]. If the former is lesser, then it replaces the latter, with QChoice[n][s'+R[n][q]] being set to q.

TABLE 5

Procedure FillLeastD
    Input: Arrays D[0 . . . 63] [1 . . . MAXQ],
           R[0 . . . 63] [0 . . . MAXSIZE]
    Output: Arrays LeastD[0 . . . 63] [0 . . . MAXSIZE,
           Qchoice[0 . . . 63] [0 . . . MAXSIZE]
    /* Initializations */
    1.    For n := 0 to 63
    2.        For s := 0 to MAXSIZE
    3.           LeastD[n] [s] := INFINITY
    /* Fill row number zero */
    4.    For q := 1 to MAXQ
    5.        If (D[0] [q] < LeastD[0] [R[0] [q]] ) then
    6.           LeastD[0] [R[0] [q]] := D[0][q]
    7.           QChoice[0] [R[0] [q]] := q
    /* Main loop */
    8.    For n := 1 to 63
    9.        For q := 1 to MAXQ
    10.           For s' := 0 to MAXRATE
    11.               If (D[n] [q] + LeastD[n-1] [s'] < LeastD[n] [s'
                    + R[n] [q]]) Then
    12.               s := s' + R[n] [q]
    13.               LeastD[n] [s] := D[n] [q] + LeastD[n-1] [s']
    14.               QChoice[n] [s] := q Now, if a total distortion requirement Δ is to be met, it is straightforward to find the least s such that LeastD[63][s] ≤Δ. Similarly, if a rate requirement B is to be met, it is easy to find s such that s≤B and LeastD[63][s] is the minimum over all such s. Thus, in both cases, a starting point s is in the 63rd row. To recover the desired quantization table Q from that point, procedure RecoverQ, shown below in Table 6 in pseudo-software code and which corresponds to step 308 in FIG. 6, is used. This procedure recovers the quantization table Q for target rate s by setting Q[63] to QChoice[63][s] and then working its way up the rows as follows. For going from row number n to row number n-1, s is decremented by R[n][Q [n]] and then Q[n-1] is set to QChoice[n-1][s].

TABLE 6

Procedure RecoverQ
    Input: Array QChoice[0 . . . 63] [0 . . . MAXSIZE]; Target rate s
    Output: Quantization table Q[0 . . . 63]
    1. For n := 63 down to 0
    2. Q[n] := Qchoice[n] [s]
    3. s := s - R[n] [Q[n]]

It will be appreciated by those skilled in the art that the GatherStats procedure should execute in about the time that is required to apply the DCT once to each block in the image. Also, the FillD and FillR procedures each run in less time than a constant times 64×MAXQ×VMAX.

In addition, the FillLeastD procedure runs in less time than a constant times 64×MAXQ×MAXRATE. In any practical implementation, this can be substantially reduced. The loop range in line 9 of Table 5 can be made 1 to MAXQ(n) where MAXQ(n) is the minimum of MAXQ and the least value of Q[n] that will make the $n^{th}$ coefficient zero everywhere in the image. The loop range in line 10 for s' can be made 1 to the last entry in the $(n-1)^{th}$ row which is not marked ∞. Further, if only one given target distortion or target rate is to be met, then the loops can be pruned to exclude cases which will clearly be outside the given specifications. Also, only two rows of the table LeastD need to be maintained at any point: the current row and the previous row.

Further, the key idea is entirely symmetrical, in the sense that an array LeastR can be maintained instead of LeastD. As a result, a procedure FillLeastR analogous to FillLeastD would be used. In this case, distortion would need to be discretized to integral values. The choice of the procedure to be used depends on various factors such as the range of values spanned by distortion and rate, and the errors incurred by discretizing them to integers.

The RD-OPT algorithm has another interesting feature in that the final results are independent of the order in which the coefficients are considered. This implies that it can be readily parallelized. The 64 rows can be pairwise combined, then the 32 "composite" rows can be pairwise combined, and so on.

Another variation is to use weighted mean squared error instead of mean squared error by assigning different weights to errors in different frequencies in FillD. This might be used to give distortion in lower frequencies more importance.

For better visual quality, it may be useful to do adaptive quantization which gives more bits for encoding regions in the image that are perceptually more significant. This is done in MPEG by scaling the quantization table up or down on a per-macroblock basis. Thus, for any block f, the quantization table used is Q times $qscale_f$, where Q is a nominal quantization table and $qscale_f$ is a factor that depends upon the macroblock containing f. The value of $qscale_f$ should be chosen based upon characteristics such as texture, total energy, presence of edges, etc. However, $qscale_f$ does not depend upon Q. Hence, while gathering statistics (i.e., procedure GatherStats) $qscale_f$ can be determined for each block. The entry OccursCount[n][v] can be filled by setting v to be the actual value of the $n^{th}$ coefficient divided by qscalef for the block under consideration. Then, FillLeastD will optimize Q to give the best rate-distortion tradeoff for the adaptive quantization scheme.

The present invention can be summarized in reference to FIG. 1 which is a block diagram of the preferred embodiment discrete cosine transform-based digital image compression and decompression system 100. The system 100 includes a transmitting device which receives input digital image data 102, generates compressed digital image data 116, and transmits, through a transmitter 112, the compressed digital image data 114 and a rate-distortion-optimal quantization table 114 over a communication channel 118. The transmitting device generates compressed digital image data 116 by utilizing a discrete cosine transformer 104 which divides the input digital image data 102 into fixed length image blocks and generates a corresponding block of discrete cosine transform coefficients for each fixed length image block by applying a discrete cosine transform to each fixed length image block.

A quantization table generator 106 (i.e., a digital image compression preprocessor 106) is operatively coupled to the discrete cosine transformer 104 to generate the rate-distortion-optimal quantization table by determining discrete cosine transform statistics from each block of discrete cosine transform coefficients, calculating an image distortion array and a rate of image compression array based upon the discrete cosine transform statistics for each possible quantization value, and optimizing the rate of image compression array against the image distortion array to derive the rate-distortion-optimal quantization table.

A quantizer 108 is operatively coupled to the discrete cosine transformer 104 and the quantization table generator 106 to generate a corresponding block of quantized discrete cosine transform coefficients for each block of discrete cosine transform coefficients by quantizing each block of discrete cosine transform coefficients with the rate-distortion-optimal quantization table. An entropy coder 110 is operatively coupled to the quantizer 108 to entropy encode (such as with Huffman codes which exploit similarities across the quantized discrete cosine transform coefficients) each block of quantized discrete cosine transform coefficients to form a corresponding compressed block such that a sequence of all of the compressed blocks forms the compressed digital image data.

It will be appreciated by those skilled in the art that the communication channel can take many forms including, but not limited to, a serial communication line, a parallel communication line, a data network, a public switched telephone network, a optically-encoded disk, a magnetically-encoded disk, and/or a radio communication link.

A receiving device which receives, through a receiver 124, the compressed digital image data 122 and the rate-distortion-optimal quantization table 122 from the communication channel 118 and generates 120 decompressed digital image data 132 is also a part of the system 100. The receiving device generates 120 decompressed digital image data 132 by utilizing a decoder 126 to decode each entropy-coded compressed block in the received compressed digital image data 122 into a corresponding block of quantized discrete cosine transform coefficients. A dequantizer 128 is operatively coupled to the decoder 126 to generate a corresponding block of discrete cosine transform coefficients for each block of quantized discrete cosine transform coefficients based on the received rate-distortion-optimal quantization table 122. An inverse discrete cosine transformer 130 is operatively coupled to the dequantizer 128 to generating a corresponding decompressed block of fixed length digital image data for each block of discrete cosine transform coefficients by applying an inverse discrete cosine transform to each block of discrete cosine transform coefficients such that a sequence of all of the decompressed blocks forms the decompressed digital image data 132.

The system 100 may also include an input device which is operatively coupled to the transmitting device for receiving the input digital image data from a device external to the digital image compression and decompression system 100. The input device may be a serial communications port, a parallel communications port, a data network interface (i.e., to a computer data bus, ethernet, fiber-optic network or the like), a public switched telephone network (PSTN) adapter, a optically-encoded disk drive, a magnetically-encoded disk drive (e.g., a floppy or hard disk drive), and/or a radio communication unit for a trunked radio network, cellular radio voice or data packet network, personal communication network, and/or satellite system. The transmitter 112 in system 100 may also transmit the compressed digital image data and the rate-distortion-optimal quantization table through the same sort of devices and the input devices.

The quantization table generator 106 of system 100 preferably is configured to generate the rate-distortion-optimal quantization table according to a particular algorithm. This algorithm includes determining discrete cosine transform statistics from input digital image data by dividing the input digital image data into fixed length image blocks, applying a discrete cosine transform to each fixed length image block to generate a corresponding block of discrete cosine transform coefficients for each fixed length image block, and counting a number of times each discrete cosine transform coefficient has a non-zero value for all of the fixed length image blocks divided out of the input digital image data. In addition, the algorithm includes calculating the rate of image compression array by calculating entropy of each discrete cosine transform coefficient when quantized by each possible quantization value as a function of the counted number of times each discrete cosine transform coefficient has a non-zero value. Also, the algorithm includes calculating the image distortion array by calculating error produced when quantizing each discrete cosine transform coefficient by each possible quantization value as a function of the counted number of times each discrete cosine transform coefficient has a non-zero value. Further, the algorithm includes deriving the rate-distortion-optimal quantization table by calculating a least distortion array containing the least distortion produced for each discrete cosine transform coefficient at each rate of image compression as a function of the image distortion array and the rate of image compression array, calculating an array of quantization values which produced each entry in the least distortion array, and determining the rate-distortion-optimal quantization table at least as a function of the array of quantization values which produced each entry in the least distortion array.

The quantization table generator 106 of system 100 may also include a mechanism for discretizing values in one of the image distortion array and the rate of image compression array to integral values prior to deriving the rate-distortion-optimal quantization table.

The quantization table generator 106 of system 100 preferably includes a mechanism for optimizing the rate of image compression array against the image distortion array with respect to a total image distortion requirement to derive the rate-distortion-optimal quantization table having a maximal rate of image compression with a total image distortion less than the total image distortion requirement.

Alternatively, the quantization table generator 106 of system 100 may include a mechanism for optimizing the rate of image compression array against the image distortion array with respect to a rate of image compression requirement to derive the rate-distortion-optimal quantization table having a minimal total image distortion with a rate of image compression greater than the rate of image compression requirement.

Also, the quantization table generator 106 of system 100 preferably includes apparati for configuring the rate-distortion-optimal quantization table for use with various image compression standard algorithms such that the digital image compression and decompression system 100 utilizes any one of the following image compression standard algorithms, including: a joint photographic experts group (JPEG) image compression standard algorithm, a motion picture experts group (MPEG) image compression standard algorithm, and a H.261 video compression standard algorithm.

It will be appreciated by those skilled in the art that the system 100 can be subdivided into distinct parts and implemented separately based on function. For example, a single discrete cosine transform-based digital image compression device 116 could be produced. Similarly, the functions of the quantization table generator 106 may be implemented as a digital image compression preprocessor 106.

Also, the system 100 and its parts may be described in reference to methods for: generating a rate-distortion-optimal quantization table, using discrete cosine transform-based digital image compression, and operating a discrete cosine transform-based digital image compression and decompression system.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed. For example, pseudo-software code described above is provided for discussion purposes only. This underlying algorithm could be implemented in other pseudo-software code without departing from the scope and spirit of the present invention as claimed. In addition, the pseudo-software code could be implemented in any computer software language or set in firmware without departing from the spirit and scope of the invention as claimed.

What is claimed is:

1. A digital image compression preprocessor for use in a discrete cosine transform-based digital image compression device, the preprocessor comprising:

(a) gathering means for determining discrete cosine transform statistics from input digital image data, wherein the discrete cosine transform statistics include counts related to the number of times each of a plurality of discrete cosine transform coefficients derived from the input digital image data takes a value;

(b) computing means, operatively coupled to the gathering means, for calculating an image distortion array and a rate of image compression array based upon the discrete cosine transform statistics for each of a plurality of possible quantization values; and (c) quantization table generating means, operatively coupled to the computing means, for optimizing the rate of image compression array against the image distortion array to derive a rate-distortion-optimal quantization table.

2. The digital image compression preprocessor of claim 1 wherein the gathering means comprises means for determining discrete cosine transform statistics from input digital image data by dividing the input digital image data into fixed length image blocks, applying a discrete cosine transform to each fixed length image block to generate a corresponding block of discrete cosine transform coefficients for each fixed length image block, and counting a number of times each discrete cosine transform coefficient has a non-zero value for all of the fixed length image blocks divided out of the input digital image data.

3. The digital image compression preprocessor of claim 2 wherein the computing means comprises means for calculating the rate of image compression array by calculating entropy of each discrete cosine transform coefficient when quantized by each possible quantization value as a function of the counted number of times each discrete cosine transform coefficient has a non-zero value.

4. The digital image compression preprocessor of claim 3 wherein the computing means comprises means for calculating the image distortion array by calculating error produced when quantizing each discrete cosine transform coefficient by each possible quantization value as a function of the counted number of times each discrete cosine transform coefficient has a non-zero value.

5. The digital image compression preprocessor of claim 4 wherein the quantization table generating means comprises means for deriving the rate-distortion-optimal quantization table by calculating a least distortion array containing the least distortion produced for each discrete cosine transform coefficient at each rate of image compression as a function of the image distortion array and the rate of image compression array, calculating an array of quantization values which produced each entry in the least distortion array, and determining the rate-distortion-optimal quantization table at least as a function of the array of quantization values which produced each entry in the least distortion array.

6. The digital image compression preprocessor of claim 5 wherein the quantization table generating means comprises means for discretizing values in one of the image distortion array and the rate of image compression array to integral values prior to the deriving of the rate-distortion-optimal quantization table.

7. The digital image compression preprocessor of claim 1 wherein the quantization table generating means comprises means for optimizing the rate of image compression array against the image distortion array with respect to a total image distortion requirement to derive a rate-distortion-optimal quantization table having a maximal rate of image compression with a total image distortion less than the total image distortion requirement.

8. The digital image compression preprocessor of claim 1 wherein the quantization table generating means comprises means for optimizing the rate of image compression array against the image distortion array with respect to a rate of image compression requirement to derive a rate-distortion-optimal quantization table having a minimal total image distortion with a rate of image compression greater than the rate of image compression requirement.

9. The digital image compression preprocessor of claim 1 wherein the digital image compression device utilizes joint photographic experts group (JPEG) image compression standard algorithms and wherein the quantization table generating means comprises means for configuring the rate-distortion-optimal quantization table for use with the joint photographic experts group (JPEG) image compression standard algorithms.

10. The digital image compression preprocessor of claim 1 wherein the digital image compression device utilizes motion picture experts group (MPEG) image compression standard algorithms and wherein the quantization table generating means comprises means for configuring the rate-distortion-optimal quantization table for use with the motion picture experts group (MPEG) image compression standard algorithms.

11. The digital image compression preprocessor of claim 1 wherein the digital image compression device utilizes H.261 video compression standard algorithms and wherein the quantization table generating means comprises means for configuring the rate-distortion-optimal quantization table for use with the H.261 video compression standard algorithms.

12. A discrete cosine transform-based digital image compression device, comprising:
  (a) discrete cosine transformer means for dividing input digital image data into fixed length image blocks and generating a corresponding block of discrete cosine transform coefficients for each fixed length image block by applying a discrete cosine transform to each fixed length image block;
  (b) quantization table generator, operatively coupled to the discrete cosine transformer means, which generates a rate-distortion-optimal quantization table, comprising:
    (i) gathering means for determining discrete cosine transform statistics from each block of discrete cosine transform coefficients, wherein the discrete cosine transform statistics include counts related to the number of times each discrete cosine transform coefficient from the blocks takes a value;
    (ii) computing means, operatively coupled to the gathering means, for calculating an image distortion array and a rate of image compression array based upon the discrete cosine transform statistics for each of a plurality of possible quantization values; and
    (iii) quantization table generating means, operatively coupled to the computing means, for optimizing the rate of image compression array against the image distortion array to derive the rate-distortion-optimal quantization table;
  (c) quantizing means, operatively coupled to the discrete cosine transformer means and the quantization table generating means, for generating a corresponding block of quantized discrete cosine transform coefficients for each block of discrete cosine transform coefficients by quantizing each block of discrete cosine transform coefficients with the rate-distortion-optimal quantization table; and
  (d) entropy coding means, operatively coupled to the quantizing means, for entropy coding each block of quantized discrete cosine transform coefficients to form a corresponding compressed block such that a sequence of all of the compressed blocks forms the compressed digital image data.

13. The digital image compression device of claim 12 wherein the entropy coding means comprises means for entropy coding each block of quantized discrete cosine transform coefficients with Huffman codes to exploit similarities across the quantized discrete cosine transform coefficients.

14. The digital image compression device of claim 12 further comprising input means, operatively coupled to the discrete cosine transformer means, for receiving the input digital image data from a device external to the digital image compression device.

15. The digital image compression device of claim 14 wherein the device external to the digital image compression device is selected from the group consisting of a serial communications port, a parallel communications port, a data network interface, a public switched telephone network adapter, an optically-encoded disk drive, a magnetically-encoded disk drive, and a radio communication unit.

16. The digital image compression device of claim 12 further comprising transmitting means, operatively coupled to the entropy coding means, for transmitting the compressed digital image data and the rate-distortion-optimal quantization table to a device external to the digital image compression device.

17. The digital image compression device of claim 16 wherein the device external to the digital image compression device is selected from the group consisting of a serial communications port, a parallel communications port, a data network interface, a public switched telephone network adapter, an optically-encoded disk drive, a magnetically-encoded disk drive, and a radio communication unit.

18. The digital image compression device of claim 12 wherein:
  (a) the quantization table generator gathering means comprises means for determining discrete cosine transform statistics from input digital image data by dividing the input digital image data into fixed length image blocks, applying a discrete cosine transform to each fixed length image block to generate a corresponding block of discrete cosine transform coefficients for each fixed length image block, and counting a number of times each discrete cosine transform coefficient has a non-zero value for all of the fixed length image blocks divided out of the input digital image data;
  (b) the quantization table generator computing means comprises means for calculating the rate of image compression array by calculating entropy of each discrete cosine transform coefficient when quantized by each possible quantization value as a function of the counted number of times each discrete cosine transform coefficient has a non-zero value;
  (c) the quantization table generator computing means comprises means for calculating the image distortion array by calculating error produced when quantizing each discrete cosine transform coefficient by each possible quantization value as a function of the counted number of times each discrete cosine transform coefficient has a non-zero value; and
  (d) the quantization table generator quantization table generating means comprises means for deriving the rate-distortion-optimal quantization table by calculating a least distortion array containing the least distortion produced for each discrete cosine transform coefficient at each rate of image compression as a function of the image distortion array and the rate of image compression array, calculating an array of quantization values which produced each entry in the least distortion array, and determining the rate-distortion-optimal quantization table at least as a function of the array of quantization values which produced each entry in the least distortion array.

19. The digital image compression device of claim 18 wherein the quantization table generator quantization table generating means comprises means for discretizing values in one of the image distortion array and the rate of image compression array to integral values prior to deriving the rate-distortion-optimal quantization table.

20. The digital image compression device of claim 12 wherein the quantization table generator quantization table generating means comprises means for optimizing the rate of image compression array against the image distortion array with respect to a total image distortion requirement to derive a rate-distortion-optimal quantization table having a maximal rate of image compression with a total image distortion less than the total image distortion requirement.

21. The digital image compression device of claim 12 wherein the quantization table generator quantization table generating means comprises means for optimizing the rate of image compression array against the image distortion array with respect to a rate of image compression requirement to derive a rate-distortion-optimal quantization table having a minimal total image distortion with a rate of image compression greater than the rate of image compression requirement.

22. The digital image compression device of claim 12 wherein the quantization table generator quantization table generating means comprises means for configuring the rate-distortion-optimal quantization table for use with image compression standard algorithms such that the digital image compression device utilizes an image compression standard algorithm selected from the group consisting of a joint photographic experts group (JPEG) image compression standard algorithm, a motion picture experts group (MPEG) image compression standard algorithm, and a H.261 video compression standard algorithm.

23. A discrete cosine transform-based digital image compression and decompression system, comprising:
  (a) a transmitting device which receives input digital image data, generates compressed digital image data, and transmits the compressed digital image data and a rate-distortion-optimal quantization table over a communication channel, the transmitting device comprising:
    (i) discrete cosine transformer means for dividing the input digital image data into fixed length image blocks and generating a corresponding block of discrete cosine transform coefficients for each fixed length image block by applying a discrete cosine transform to each fixed length image block;
    (ii) quantization table generating means, operatively coupled to the discrete cosine transformer means, for generating the rate-distortion-optimal quantization table by determining discrete cosine transform statistics from each block of discrete cosine transform coefficients, wherein the discrete cosine transform statistics include counts related to the number of times each discrete cosine transform coefficient from the blocks takes a value, calculating an image distortion array and a rate of image compression array based upon the discrete cosine transform statistics for each of a plurality of possible quantization values, and optimizing the rate of image compression array against the image distortion array to derive the rate-distortion-optimal quantization table;
    (iii) quantization means, operatively coupled to the discrete cosine transformer means and the quantization table generating means, for generating a corresponding block of quantized discrete cosine transform coefficients for each block of discrete cosine transform coefficients by quantizing each block of discrete cosine transform coefficients with the rate-distortion-optimal quantization table; and
    (iv) entropy coding means, operatively coupled to the quantizing means, for entropy coding each block of quantized discrete cosine transform coefficients to form a corresponding compressed block such that a sequence of all of the compressed blocks forms the compressed digital image data; and
  (b) a receiving device which receives the compressed digital image data and the rate-distortion-optimal quantization table from the communication channel and generates decompressed digital image data, the receiving device comprising:
    (i) decoding means for decoding each entropy-coded compressed block in the received compressed digital image data into a corresponding block of quantized discrete cosine transform coefficients;
    (ii) dequantizing means, operatively coupled to the decoding means, for generating a corresponding block of discrete cosine transform coefficients for each block of quantized discrete cosine transform coefficients based on the received rate-distortion-optimal quantization table; and
    (iii) inverse discrete cosine transformer means, operatively coupled to the dequantizing means, for generating a corresponding decompressed block of fixed length digital image data for each block of discrete cosine transform coefficients by applying an inverse discrete cosine transform to each block of discrete cosine transform coefficients such that a sequence of all of the decompressed blocks forms the decompressed digital image data.

24. The digital image compression and decompression system of claim 23 wherein the communication channel is selected from the group consisting of a serial communication line, a parallel communication line, a data network, a public switched telephone network, an optically-encoded disk, a magnetically-encoded disk, and a radio communication link.

25. The digital image compression and decompression system of claim 23 further comprising input means, operatively coupled to the transmitting device, for receiving the input digital image data from a device external to the digital image compression and decompression system.

26. The digital image compression and decompression system of claim 25 wherein the input means is selected from the group consisting of a serial communications port, a parallel communications port, a data network interface, a public switched telephone network adapter, an optically-encoded disk drive, a magnetically-encoded disk drive, and a radio communication unit.

27. The digital image compression and decompression system of claim 23 wherein the quantization table generating means is configured to generate the rate-distortion-optimal quantization table by:
  (a) determining discrete cosine transform statistics from input digital image data by dividing the input digital image data into fixed length image blocks, applying a discrete cosine transform to each fixed length image block to generate a corresponding block of discrete cosine transform coefficients for each fixed length image block, and counting a number of times each discrete cosine transform coefficient has a non-zero value for all of the fixed length image blocks divided out of the input digital image data;
  (b) calculating the rate of image compression array by calculating entropy of each discrete cosine transform coefficient when quantized by each possible quantization value as a function of the counted number of times each discrete cosine transform coefficient has a non-zero value;
  (c) calculating the image distortion array by calculating error produced when quantizing each discrete cosine transform coefficient by each possible quantization value as a function of the counted number of times each discrete cosine transform coefficient has a non-zero value; and (d) deriving the rate-distortion-optimal quantization table by calculating a least distortion array containing the least distortion produced for each discrete cosine transform coefficient at each rate of image compression as a function of the image distortion array and the rate of image compression array, calculating an array of quantization values which produced each entry in the least distortion array, and determining the rate-distortion-optimal quantization table at least as a function of the array of quantization values which produced each entry in the least distortion array.

28. The digital image compression and decompression system of claim 27 wherein the quantization table generating means comprises means for discretizing values in one of the image distortion array and the rate of image compression array to integral values prior to deriving the rate-distortion-optimal quantization table.

29. The digital image compression and decompression system of claim 23 wherein the quantization table generating means comprises means for optimizing the rate of image compression array against the image distortion array with respect to a total image distortion requirement to derive a rate-distortion-optimal quantization table having a maximal rate of image compression with a total image distortion less than the total image distortion requirement.

30. The digital image compression and decompression system of claim 23 wherein the quantization table generating means comprises means for optimizing the rate of image compression array against the image distortion array with respect to a rate of image compression requirement to derive a rate-distortion-optimal quantization table having a minimal total image distortion with a rate of image compression greater than the rate of image compression requirement.

31. The digital image compression and decompression system of claim 23 wherein the quantization table generating means comprises means for configuring the rate-distortion-optimal quantization table for use with image compression standard algorithms such that the digital image compression and decompression system utilizes an image compression standard algorithm selected from the group consisting of a joint photographic experts group (JPEG) image compression standard algorithm, a motion picture experts group (MPEG) image compression standard algorithm, and a H.261 video compression standard algorithm.

32. A method for generating a rate-distortion-optimal quantization table for use in a discrete cosine transform-based digital image compression process, the method comprising the steps of:

(a) determining discrete cosine transform statistics from input digital image data, wherein the discrete cosine transform statistics include counts related to the number of times each of a plurality of discrete cosine transform coefficients derived from the input digital image data takes a value;

(b) calculating an image distortion array and a rate of image compression array based upon the discrete cosine transform statistics for each of a plurality of possible quantization values; and (c) optimizing the rate of image compression array against the image distortion array to derive the rate-distortion-optimal quantization table.

33. The method of claim 32 wherein the determining step comprises determining discrete cosine transform statistics from input digital image data by dividing the input digital image data into fixed length image blocks, applying a discrete cosine transform to each fixed length image block to generate a corresponding block of discrete cosine transform coefficients for each fixed length image block, and counting a number of times each discrete cosine transform coefficient has a non-zero value for all of the fixed length image blocks divided out of the input digital image data.

34. The method of claim 33 wherein the calculating step comprises calculating the rate of image compression array by calculating entropy of each discrete cosine transform coefficient when quantized by each possible quantization value as a function of the counted number of times each discrete cosine transform coefficient has a non-zero value.

35. The method of claim 34 wherein the calculating step comprises calculating the image distortion array by calculating error produced when quantizing each discrete cosine transform coefficient by each possible quantization value as a function of the counted number of times each discrete cosine transform coefficient has a non-zero value.

36. The method of claim 35 wherein the optimizing step comprises deriving the rate-distortion-optimal quantization table by calculating a least distortion array containing the least distortion produced for each discrete cosine transform coefficient at each rate of image compression as a function of the image distortion array and the rate of image compression array, calculating an array of quantization values which produced each entry in the least distortion array, and determining the rate-distortion-optimal quantization table at least as a function of the array of quantization values which produced each entry in the least distortion array.

37. The method of claim 35 wherein the optimizing step comprises discretizing values in one of the image distortion array and the rate of image compression array to integral values prior to the step of deriving the rate-distortion-optimal quantization table.

38. The method of claim 32 wherein the optimizing step comprises optimizing the rate of image compression array against the image distortion array with respect to a total image distortion requirement to derive the rate-distortion-optimal quantization table having a maximal rate of image compression with a total image distortion less than the total image distortion requirement.

39. The method of claim 32 wherein the optimizing step comprises optimizing the rate of image compression array against the image distortion array with respect to a rate of image compression requirement to derive the rate-distortion-optimal quantization table having a minimal total image distortion with a rate of image compression greater than the rate of image compression requirement.

40. The method of claim 32 wherein the method is modified such that the generated rate-distortion-optimal quantization table is configured for use with an image compression standard algorithm selected from the group consisting of a joint photographic experts group (JPEG) image compression standard algorithm, a motion picture experts group (MPEG) image compression standard algorithm, and a H.261 video compression standard algorithm.

41. A discrete cosine transform-based digital image compression method having the step of generating a rate-distortion-optimal quantization table as claimed in claim 32 and further comprising the steps of:

(a) dividing input digital image data into fixed length image blocks and generating a corresponding block of discrete cosine transform coefficients for each fixed length image block by applying a discrete cosine transform to each fixed length image block;

(b) generating a corresponding block of quantized discrete cosine transform coefficients for each block of discrete cosine transform coefficients by quantizing each block of discrete cosine transform coefficients with the rate-distortion-optimal quantization table; and (c) entropy coding each block of quantized discrete cosine transform coefficients to form a corresponding compressed block such that a sequence of all of the compressed blocks forms the compressed digital image data.

42. The method of claim 41 wherein the entropy coding step comprises entropy coding each block of quantized discrete cosine transform coefficients with Huffman codes to exploit similarities across the quantized discrete cosine transform coefficients.

43. A method for operating a discrete cosine transform-based digital image compression and decompression system having the steps of discrete cosine transform-based digital image compressing as claimed in claim 41 and further comprising these steps of:

(a) transmitting the compressed digital image data and a rate-distortion-optimal quantization table over a communication channel;

(b) receiving the compressed digital image data and the rate-distortion-optimal quantization table from the communication channel;

(c) decoding each entropy-coded compressed block in the received compressed digital image data into a corresponding block of quantized discrete cosine transform coefficients;

(d) generating a corresponding block of discrete cosine transform coefficients for each block of quantized discrete cosine transform coefficients based on the received rate-distortion-optimal quantization table; and (e) generating a corresponding decompressed block of fixed length digital image data for each block of discrete cosine transform coefficients by applying an inverse discrete cosine transform to each block of discrete cosine transform coefficients such that a sequence of all of the decompressed blocks forms decompressed digital image data.

44. The method of claim 43 wherein the steps of transmitting and receiving utilize a communication channel selected from the group consisting of a serial communication line, a parallel communication line, a data network, a public switched telephone network, an optically-encoded disk, a magnetically-encoded disk, and a radio communication link.

* * * * *